May 28, 1957　　W. G. N. HEER ET AL　　2,793,472
SEALING CATHODE TUBES
Filed March 30, 1955
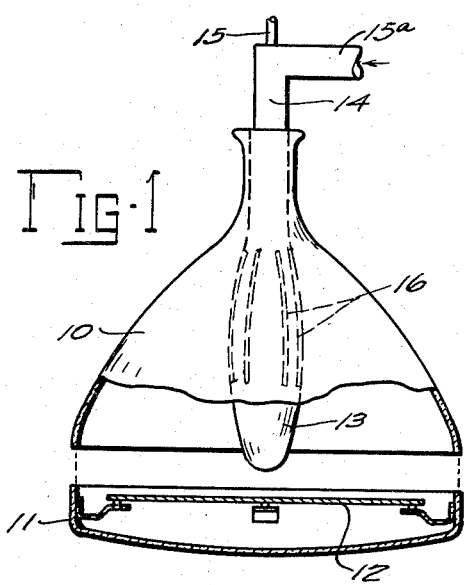
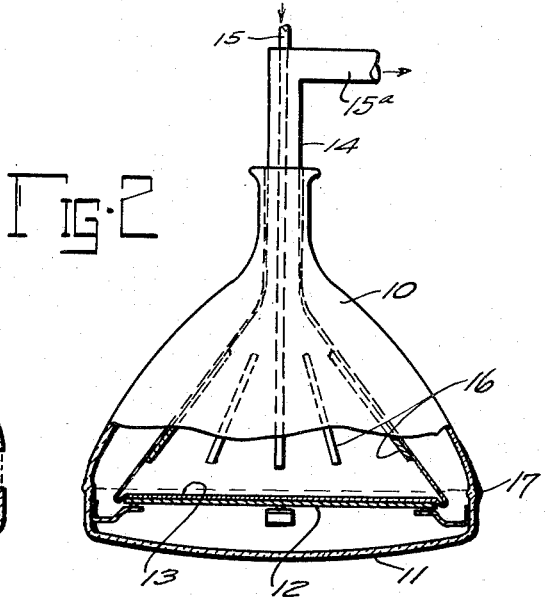
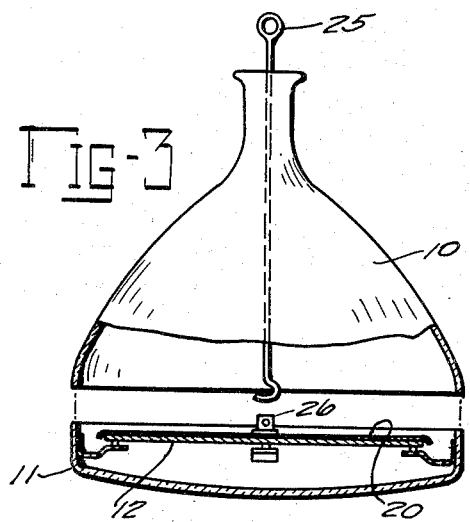
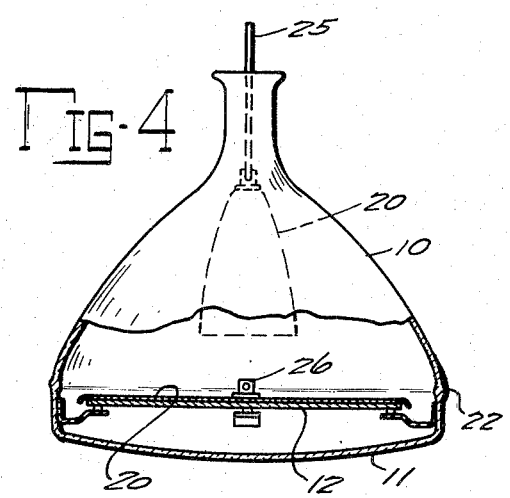
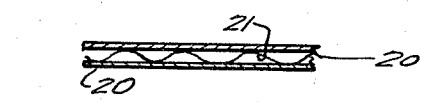
INVENTORS
WILLIAM G. N. HEER
BERNARD L. STEIERMAN
BY
ATTORNEYS

United States Patent Office 2,793,472
Patented May 28, 1957

2,793,472

SEALING CATHODE TUBES

William G. N. Heer and Bernard L. Steierman, Toledo, Ohio, assignors to Owens-Illinois Glass Company, a corporation of Ohio Application March 30, 1955, Serial No. 497,852

4 Claims. (Cl. 49—82)

This invention relates to the sealing and assembling of cathode tubes and in particular, to the sealing of tubes adapted for the transmission of images in color.

In such tubes it is necessary to provide a means for imposing color beams upon a phosphor surface and both such means and surface generally are of a type or structure not capable of withstanding the high temperatures required in the sealing of glass parts. The color pack and the phosphors used in a cathode tube for the production of color pictures generally will not withstand temperatures above about 440° C. This temperature is considerably below that which is required to seal glass parts together in a glass-to-glass contact seal and as a consequence, some means is necessary to protect these mechanisms in a color tube during the sealing operation. This invention is primarily concerned with providing such protection and the means for providing the protection must of necessity be capable of withstanding temperatures ranging upwardly to approximately 1900° F.

Normally the heat utilized for sealing glass parts is provided by a combustion burner and sometimes this is accelerated by adding electrical energy thereto. In order that the edges of the glass parts may be softened to the sealing point without exhorbitant deformation, the flame must be played upon and along the edges in a particular manner and this requires that the flame will generally be projected in the general direction of the mechanism mounted in the interior of the tube.

The primary object of this invention is to provide a heat radiation shield or screen of a type capable of repelling excessive heat from contact with the color mechanism.

A further object is to provide such a radiation screen which is capable of expansion and contraction.

Other objects will be in part apparent and in part pointed out hereinafter.

In the drawings:

Fig. 1 is a part-sectional elevational view illustrating the heat radiation screen in collapsed form;

Fig. 2 is a part-sectional elevational view showing the heat radiation screen in expanded form and covering the color mechanism;

Fig. 3 is a part-sectional elevational view illustrating the arrangement of one form of a heat radiation screen within the confines of the tube parts;

Fig. 4 is a part-sectional elevational view showing the method of removing the heat radiation screen; and Fig. 5 is a part-sectional view showing a laminate structure for a heat radiation screen.

The general procedure in utilizing this invention requires that the heat radiation screen be positioned over the color mechanism of a cathode tube prior to the positioning of the glass parts in sealing relationship. It is also a requisite that the heat radiation screen be of a collapsible type in order that it may be later removed from the cathode tube at the completion of the joining of the glass parts.

In one form of such a heat radiation screen it is contemplated to use a hollow bag member formed of a composition, such as silicone rubber, which is capable of withstanding fairly high temperatures. Such a bag is attached to a cooling supply source in order that a coolant may be passed to and from the bag when it is in use.

Referring to Fig. 1, there is illustrated a collapsible bag in collapsed condition shown extending through the funnel portion of a cathode tube. Water or other coolant is admitted to the bag and the weight of the coolant causes it to expand and provide a protective covering over the color mechanism such as is illustrated in Fig. 2.

When the bag has been expanded, the two glass parts have their adjoining edge surfaces brought into contact and heat, such as supplied by a combustion burner, is applied to the edges to soften the glass and bring it to a sealing condition. With the completion of the sealing operation, the coolant to the collapsible bag is discontinued and the bag may then collapse and be withdrawn through the restricted neck portion of the funnel section of the tube.

As another form of this invention we have shown in Fig. 3, the use of a foil heat radiation screen which may be formed from two or more sheets of aluminum foil maintained separate from each other by an interposed sheet of crimped or dimpled form. These foil sheets are so thin that they will drape themselves in such manner that they may easily be removed through the neck portion of the funnel of the tube. In this form it is not necessary to have a coolant because the foils are generally of a highly reflective nature and if made of aluminum, are capable of withstanding temperatures in excess of 1000° F. Because of the reflective nature, the heat is reflected away from the color mechanism of the tube during the sealing operation.

Referring to the drawings, numerals 10 and 11 designate the usual two glass portions of the cathode tube, respectively the funnel and face plate. Mounted in or upon the face plate is the usual color pack 12. Inserted through the neck portion of the funnel is the collapsible bag 13 which is supported by an arm 14 adapted to convey a cooling material through pipes 15 and 15a.

With the parts in the position shown in Fig. 1, a cooling medium is passed through pipe 15 to the inside of the bag 13, causing it by sheer weight to expand and form a covering over the pack 12 by assuming the position illustrated in Fig. 2. Ribs 16 guide the expansion of the bag and cause it to maintain a shape approximately as shown in Fig. 2.

The glass parts 10 and 11 are juxtaposed upon each other and the meeting edge portions are subjected to flame or heat in some form to hermetically seal the edges at 17 as is shown in Fig. 2. With the completion of the sealing of the glass parts, the flow of coolant through pipes 15 and 15a is discontinued, permitting the bag to collapse and be withdrawn from the tube.

In the form illustrated in Figs. 3 to 5, the collapsible member 20 is formed of sheets of metal foil in the form of a sandwich having one sheet of the same material interposed and formed with ribs 21 so as to provide an air space between the two metal foil sheets. In this manner an insulating heat barrier is formed which rejects the passage of heat therethrough and provides protection to the color pack 12. These foil sheets are finished in such manner as to provide surfaces having high reflectivity so that in addition to the insulating barrier, a condition of heat reflection is also provided.

In use this foil sandwich 20 is spread over the top surface of the color pack as is indicated in Figs. 3 and 4 and the two glass parts are brought into sealing relationship. Through the application of heat to the meeting edges, the parts are sealed as at 22.

With the completion of the sealing, a hook 25 is inserted through the neck portion of the funnel and is attached to a ring member 26 forming a part of the heat radiation screen 20; thus permitting the screen to be withdrawn through the neck of the funnel. This screen being of extremely thin foil, permits the heat radiation screen to drape as is shown in Fig. 4 and assume a position and dimension small enough to permit withdrawal through the restricted neck of the funnel.

The type of screen shown in Figs. 3 and 4 may also be fabricated from such material as woven asbestos fibers either in single sheet form or in laminate structure, as indicated in Fig. 5.

Other organic and inorganic materials may also be utilized in making these heat radiation screens.

Modifications may be resorted to within the spirit and scope of the appended claims.

We claim:

1. The method of joining a plurality of hollow glass parts to form a composite cathode tube having heat frangible parts therein which comprises positioning a pliable heat radiation screen member within said glass parts and over said frangible parts, juxtaposing the sealing edges of said glass parts in aligned sealing relationship, and applying sufficient heat to said edges to fusibly join them together.

2. The method in accordance with claim 1 including the removal of the heat radiation screen from the tube.

3. The method of joining the hollow glass parts of a cathode tube having heat frangible parts therein which comprises positioning an expansible heat radiation screen within said glass parts, expanding said heat radiation screen over said frangible parts, juxtaposing the sealing edges of said glass parts in aligned sealing relationship, fusibly sealing said edges together by applying a sealing heat to said edges, and collapsing and removing said screen from the tube.

4. The method of joining the hollow glass parts of a cathode tube having heat frangible parts therein which comprises positioning an expansible heat radiation screen within said glass parts, expanding said heat radiation screen over said frangible parts, circulating a coolant through said expanded screen, juxtaposing the sealing edges in aligned sealing relationship, fusibly sealing said edges together by applying heat to said edges, and collapsing and removing said screen from the tube.

References Cited in the file of this patent
UNITED STATES PATENTS 2,691,850    Eber et al. _____ Oct. 19, 1954